United States Patent
Kachu (10) Patent No.: US 7,059,444 B2
(45) Date of Patent: Jun. 13, 2006

(54) SEAT BELT DEVICE AND SEAT BELT DEVICE CONTROL METHOD

(75) Inventor: Ryotaro Kachu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 202 days.

(21) Appl. No.: 10/467,767

(22) PCT Filed: Dec. 10, 2002

(86) PCT No.: PCT/IB02/05233

§ 371 (c)(1),
(2), (4) Date: Aug. 12, 2003

(87) PCT Pub. No.: WO03/051686

PCT Pub. Date: Jun. 26, 2003

(65) Prior Publication Data

US 2004/0212189 A1    Oct. 28, 2004

(30) Foreign Application Priority Data

Dec. 18, 2001  (JP) .............................. 2001-385050

(51) Int. Cl.
*B60K 28/14* (2006.01)

(52) U.S. Cl. .................. 180/268; 180/274; 180/282; 280/806

(58) Field of Classification Search .............. 180/268, 180/271, 274, 282; 280/806; 297/480; 701/45
See application file for complete search history.

(56) References Cited

U.S. PATENT DOCUMENTS 5,552,986 A * 9/1996 Omura et al. .................. 701/45
5,558,370 A * 9/1996 Behr ........................... 280/806
5,873,599 A * 2/1999 Bauer et al. ................. 280/806
6,031,484 A * 2/2000 Bullinger et al. ............. 342/72
6,186,261 B1 * 2/2001 Stocker et al. .............. 180/274

(Continued)

FOREIGN PATENT DOCUMENTS

| DE | 44 11 184 A1 | 10/1994 |
| DE | 196 47 660 A1 | 5/1998 |
| DE | 197 39 655 A1 | 11/1998 |

(Continued)

OTHER PUBLICATIONS

J. Weller; Forward Looking Sensor System for Future Automotive Safety; VDI Berichte NR. 1471, XP-002203527; 1999; pp. 229-236.

*Primary Examiner*—Paul N. Dickson
*Assistant Examiner*—Laura B. Rosenberg
(74) *Attorney, Agent, or Firm*—Oliff & Berridge, PLC (57) ABSTRACT

A seat belt device (1) including an obstacle detection portion for detecting an obstacle in an area surrounding a vehicle, a collision prediction portion (21) for predicting a probability of a collision between the vehicle and the obstacle based on a detection signal from the obstacle detection portion, a pretensioner device (40), and a pretensioner control portion (22) which controls, when a collision prediction is received from the collision prediction portion (21), the operation of the pretensioner device (40) such that seat belt is retracted prior to the collision. Multilevel tensions for retraction of the seat belt are set for the pretensioner device (40), and furthermore, the tension of the seat belt can be change by the pretensioner control portion (22) in accordance with a collision prediction level determined by the collision prediction portion (21).

12 Claims, 3 Drawing Sheets

U.S. PATENT DOCUMENTS

| | | | |
|---|---|---|---|
| 6,256,565 B1 * | 7/2001 | Yanagi et al. | 701/45 |
| 6,374,168 B1 * | 4/2002 | Fujii | 701/45 |
| 6,463,372 B1 * | 10/2002 | Yokota et al. | 701/45 |
| 6,513,616 B1 * | 2/2003 | Bacher et al. | 180/268 |
| 6,626,463 B1 * | 9/2003 | Arima et al. | 280/806 |
| 6,702,326 B1 * | 3/2004 | Fujii | 280/806 |

FOREIGN PATENT DOCUMENTS

| | | |
|---|---|---|
| JP | A 6-286581 | 10/1994 |
| JP | A-09-272401 | 10/1997 |
| JP | A 2000-247211 | 9/2000 |
| JP | A 2001-55116 | 2/2001 |
| JP | A 2001-247008 | 9/2001 |

* cited by examiner

FIG. 1

SEAT BELT DEVICE AND SEAT BELT DEVICE CONTROL METHOD

INCORPORATION BY REFERENCE

The disclosure of Japanese Patent Application No. 2001-385050 filed on Dec. 18, 2001, including the specification, drawings and abstract is incorporated herein by reference in its entirety.

BACKGROUND OF THE INVENTION

1. Field of Invention

The invention relates to a so-called seat belt device with pretensioner for automatically retracting a seat belt. In particular, the invention relates to a seat belt device that retracts a seat belt as a precaution prior to a collision immediately after a vehicle collision is predicted, in order to reliably protect an occupant.

2. Description of Related Art

Numerous proposals have been offered related to pretensioner seat belt devices that automatically retract a seat belt during a vehicle collision, in order to protect an occupant with a greater degree of safety. For the pretensioner mechanism, devices have been widely known in which the seat belt is retracted at one stroke under great tension using an explosive or a spring, when the collision is detected.

In addition, recently, a number of suggestions have been put forward concerning pretensioner devices which prepare for a collision by retracting the seat belt as a precaution when a collision is predicted. In pretensioner devices that operate precautionarily in this manner, the seat belt is, for example, retracted at a predetermined tension by a motor, or the like. In seat belt devices adopting these pretensioner devices which retract the seat belt as a precaution prior to a predicted collision, the motor, or the like, is stopped and a normal state is returned to if the collision is avoided following prediction. Accordingly, the operation of such pretensioner devices is reversible, thus making them easy to use as compared to devices that utilize a nonreversible method such as an explosive, or the like.

A pretensioner seat belt device such as this, which retracts a seat belt as a precaution when a vehicle collision is predicted, is disclosed, for example, in Japanese Patent Laid-Open Publication 2001-247008. In the disclosed seat belt device, if a collision is predicted, a pretensioner device is operated while adjusting the tension at which the seat belt is retracted in accordance with the acceleration of the vehicle.

However, in this seat belt device, the seat belt is retracted with a fixed force (tension) if a collision is predicted, regardless of the state of the occupant within the vehicle.

Moreover, there is a high probability of a vehicle collision occurring following the prediction of a collision. However, it is possible to avoid some collisions through vehicle maneuvers by the driver. In these cases, if the driver is tightly restrained by the seat belt, a detrimental impact is exerted on the ability of the driver to execute breaking and steering operations. As a result, it is conceivable that some accidents occur which could have been avoided through driver vehicle maneuvers following prediction of the collision. In addition, there are also occasions when another occupant of the vehicle feels discomfort due to being excessively restrained by the respective seat belt.

SUMMARY OF THE INVENTION

Accordingly, it is an object of the invention to provide a seat belt with a pretensioner and a control method thereof that can reliably provide improved occupant protection prior to a collision or at times of sudden braking. This is achieved by suitably adjusting the tension of the seat belt in accordance with the probability of a collision actually occurring, when a collision is predicted or sudden braking is detected.

In order to realize the above object, a seat belt device according to an aspect of the invention includes obstacle detection means for detecting an obstacle in the area surrounding a vehicle, collision predicting means for predicting the probability of a collision between the vehicle and the obstacle based on a detection signal from the obstacle detection means, a pretensioner device, and a pretensioner control portion for controlling the operation of the pretensioner device such that the seat belt is retracted when a collision prediction is received from the collision prediction means. Multilevel tensions for retracting the seat belt are set for the pretensioner device, and furthermore, the pretensioner control portion can change the tension of the seat belt in accordance with a collision prediction level determined by the collision prediction means.

Moreover, according to the configuration of the seat belt device described above, the pretensioner control portion can change the tension at which the pretensioner device retracts the seat belt, in accordance with a collision prediction level determined by the collision prediction means. In particular, according to the invention, following a vehicle collision prediction, the force by which the occupant of a seat is restrain by the seat belt is changed prior to the expected collision, in accordance with the probability of the collision occurring. In the case that the probability of the collision occurring is relatively low, namely, when a low collision prediction level is determined, the tension of retraction is lower, thus enabling the occupant of the seat to continue acting freely. Accordingly, following the prediction of the collision, it is possible for the driver of the vehicle to smoothly execute vehicle steering operations in order to avoid the collision, while preparations for the imminently expected collision are also executed.

DETAILED DESCRIPTION OF PREFERRED EMBODIMENTS

Hereinafter, an embodiment according to one aspect of the invention will be described with reference to the drawings.

Figure 1:
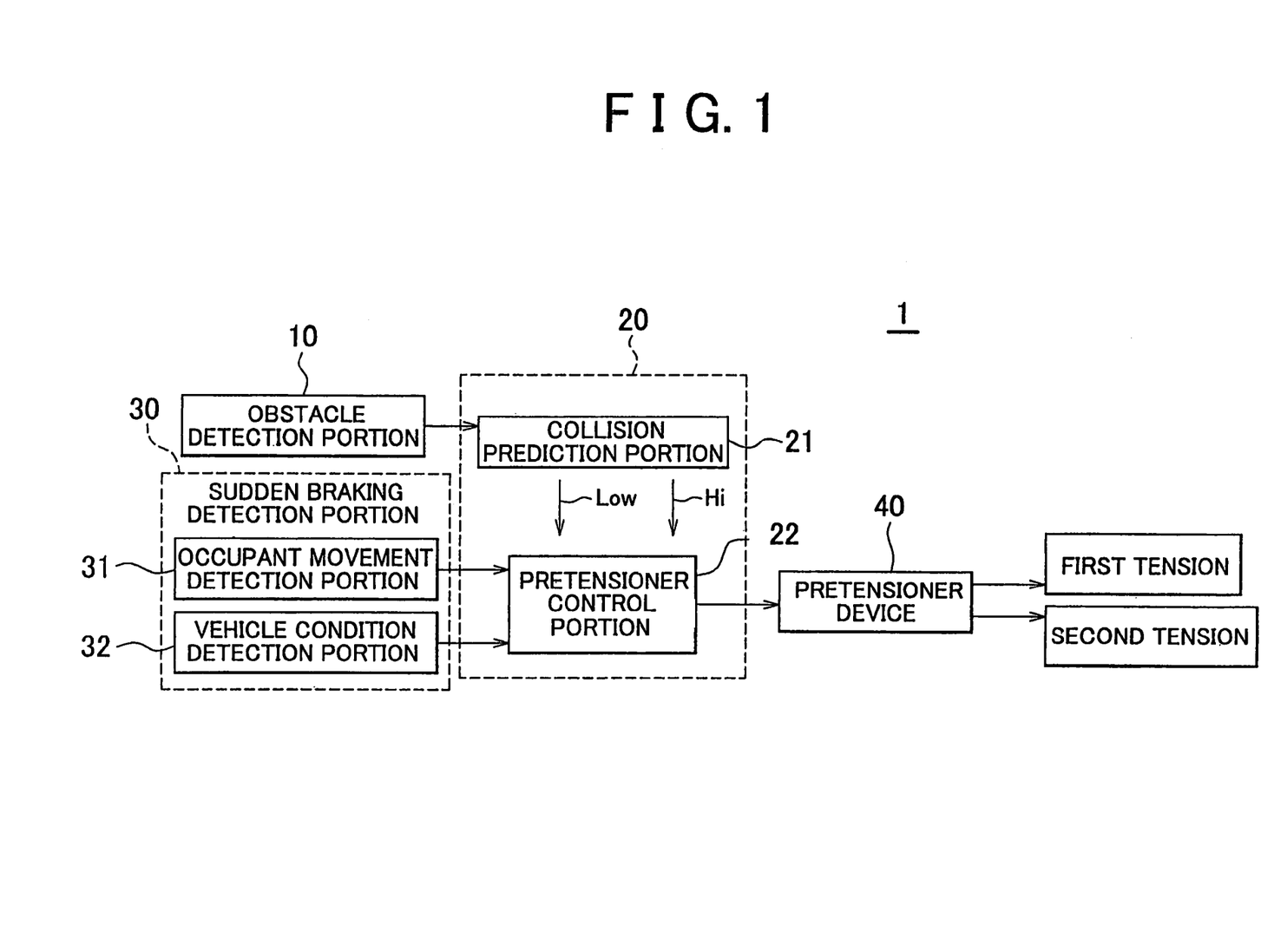
FIG. 1 is a block diagram showing a schematic outline of a seat belt device according to an embodiment of the invention.

FIG. 1 is a block diagram showing a schematic outline of a seat belt device according to the embodiment. A seat belt device 1 according to the embodiment includes an obstacle detection portion 10 as obstacle detection means, or the like. This obstacle detection portion 10 detects an obstacle that the vehicle may potentially collide with. A detection signal from the obstacle detection portion 10 is supplied to a control portion 20.

The control portion 20 includes a collision prediction portion 21 as collision prediction means, or the like. This collision prediction portion 21 executes collision prediction following receipt of the detection signal from the obstacle detection portion 10. Furthermore, this control portion 20 also includes a pretensioner control portion 22 as pretensioner control means, or the like. This pretensioner control portion 22 controls the operation of a pretensioner device 40 and changes a tension of the seat belt using the pretensioner device 40.

Moreover, the seat belt device 1 is equipped with a sudden braking detection portion 30 as sudden braking detection means, or the like. This sudden braking detection portion 30 detects a state of sudden braking, when a vehicle suddenly brakes. The sudden braking detection portion 30 detects the state of sudden braking from the position of the occupant and the condition of the vehicle, using an occupant movement detection portion 31 as occupant movement detection means, or the like and a vehicle condition detection portion 32 as vehicle condition detection means, or the like. The occupant movement detection portion 31 detects, at the least, whether the occupant of the vehicle have plunged forward. The vehicle condition detection portion 32 detects whether the vehicle has tilted forward.

It is possible to use a number of different types of sensors which can detect obstacles existing in the area surrounding the vehicle that are a potential cause of a collision as the vehicle progresses forward, as the obstacle detection portion 10. However, it is desirable that a millimeter wave sensor be used. It is possible to detect relative distance and relative speed of a vehicle with respect to obstacles, by utilizing a millimeter wave sensor. If this millimeter wave sensor is provided in the front bumper of the vehicle, or a similar location, the obstacle detection portion 10 becomes able to detect obstacles in front of the vehicle. Moreover, a plurality of millimeter wave sensors may be provided instead of just one sensor. In the case that a plurality of millimeter wave sensors are provided, it is possible to improve the accuracy at which collisions are predicted through multilevel collision prediction, by simultaneously providing sensors having different detection ranges. For example, it is possible to simultaneously provide and utilize, as the obstacle detection portion 10, a millimeter wave sensor for detecting obstacles that are comparatively far away, and a millimeter wave sensor for detecting obstacles that are extremely close.

Furthermore, the collision prediction portion 21 executes collision prediction based on the detection signal from the obstacle detection portion 10. At this time, the collision prediction portion 21 executes collision prediction such that a predicted collision is classified into a level according to the probability of an actual collision occurring. In other words, the collision prediction portion 21 executes collision prediction by classifying a predicted collisions into one of a low collision prediction level and a high collision prediction level. More particularly, the low collision prediction level indicates a prediction that there is a high chance that a collision with an obstacle will occur, although, this collision may be avoided by vehicle maneuvers following detection. However, the high collision prediction level indicates a prediction that a collision between the vehicle and the obstacle is unavoidable.

For example, in the case that the millimeter wave sensors with different detection ranges are utilized in the obstacle detection portion 10, as previously described, it is possible to execute collision prediction in the following manner; when an obstacle is detected, if only the comparatively long distance millimeter wave sensor detects the obstacle, a low collision prediction level is determined; and, when the short range millimeter wave sensor detects the obstacle, a high collision prediction level is determined. More particularly, the collision prediction portion 21 obtains the relative distance and relative speed of the vehicle with respect to the obstacle from the outputs of the millimeter wave sensors, refers to the vehicle speed, and executes collision prediction by determining a low collision prediction level or a high collision prediction level.

Furthermore, one millimeter wave sensor or one type of millimeter wave sensor may be used as the obstacle detection portion 10. In this case, collision data is obtained in advance through executing tests and simulations of vehicle and obstacle collisions, and the like, and this data is manipulated into collision prediction data and stored on a ROM, or the like. In addition, the collision prediction portion 21 may execute collision prediction and determine a low collision prediction level or a high collision prediction level through comparison of this collision prediction data and the actual millimeter wave data from the millimeter wave sensor.

Furthermore, the pretensioner control portion 22 receives a collision prediction signal which indicates one of a low collision prediction level and a high collision prediction level from the collision prediction portion 21, and executes operational control of the pretensioner device 40 based on this collision prediction signal. Furthermore, the pretensioner control portion 22 and the collision prediction portion 21 in the seat belt device 1 are realized using an electronic control unit (hereinafter referred to as "ECU").

Moreover, the pretensioner device 40, is installed in a seat belt device having a normal configuration, and retracts the seat belt using a driving source such as a motor. This pretensioner device 40 can adopt the same fundamental configuration as arts that are widely known. However, the pretensioner device 40 of the embodiment specifically adopts a configuration that permits changes of tension in a multilevel manner. As a result, if, for example, the pretensioner control portion 22 regulates the voltage supplied to the motor, the seat belt tension generated by the pretensioner device 40 can be set to one of a first tension (low) in which the seat belt has a degree of slack, and a second tension (high) where the body of the occupant is restrained.

In other words, the pretensioner control portion 22 controls the operation of the pretensioner device 40 such that when the collision prediction of the collision prediction portion 21 is a low collision prediction level the tension is set to the first tension, and when the prediction is a high collision prediction level the tension is set to the second tension.

As previously described, in the seat belt device 1 according to this embodiment, the tension of the pretensioner device 40 is changed in accordance with prediction levels indicating different collision probabilities, which are based on the detection signal from the obstacle detection portion 10. If the collision prediction level predicted by the collision prediction portion 21 is low and there is a possibility that the vehicle can avoid the collision, the seat belt is retracted at a lower tension in which the seat belt has a degree of slack, in other words, a limited degree of slack which allows a driver to move. As a result, the driver can smoothly execute breaking and steering operations in order to avoid the collision. Accordingly, it is possible to execute potential countermeasures for avoiding a collision that can be avoided after collision prediction, while also promoting occupant protection.

From the foregoing description, it is clearly understood that according to the seat belt device 1 of this embodiment, the obstacle detection portion 10 and the control portion 20 make it possible to provide occupant protection since the pretensioner device 40 can be operated in a more advantageous manner after the collision prediction.

In addition, the configuration of the seat belt device 1 according to the embodiment may be further improved by including the sudden braking detection portion 30. This improvement is achieved by focusing attention on the fact that when the vehicle is potentially going to collide with an obstacle, the vehicle enters a sudden braking state due to sudden braking operations executed by the driver. This vehicle sudden braking state is also subject to seat belt tension setting. Namely, with the seat belt device 1, when the vehicle is in a sudden braking state it is assumed that there is a possibility of a collision. Accordingly, the detection of a sudden braking state is one criterion used in changing the tension of the pretensioner device.

The sudden braking detection portion 30 includes the occupant movement detection portion 31 as the occupant movement detection means, or the like and the vehicle condition detection portion 32 as the vehicle condition detection means, or the like. As the occupant movement detection portion 31, it is possible to use a variety of types of conventional sensor for detecting whether the occupant of the vehicle has plunged forward. Moreover, as vehicle condition detection portion 32, it is possible to use a variety of types of sensor which can detect whether the vehicle has suddenly tilted forward. Particular examples of these sensors will be described hereinafter.

As shown in FIG. 1, a sudden braking detection signal from the sudden braking detection portion 30 which is based on detection signals from the occupant movement detection portion 31 and the vehicle condition detection portion 32, is supplied to the pretensioner control portion 22, like the aforementioned collision prediction signal (low or high) from the collision prediction portion 21, and is used in operational control of the pretensioner device 40.

More specifically, this sudden braking detection signal is used as an OR condition for the case where the seat belt is retracted at the aforementioned first tension (low). The reason for this is that a situation in which the driver has seen an obstacle and has suddenly depressed the brake, or the like, can be regarded as having substantially the same level of collision probability as the aforementioned case in which the comparatively long range millimeter wave sensor detected an obstacle. Furthermore, it can be assumed that when the vehicle has approached close enough to an obstacle for it to be detected on the short range millimeter wave sensor, the driver has failed to see the obstacle due to driving inattentively, falling asleep, or the like. Accordingly, the criterion for setting the second tension (high) is based on the signal from the millimeter wave sensor which detects obstacles at close range.

On the other hand, when an obstacle in front of the vehicle is far off, it is difficult to detect the obstacle using the millimeter wave sensor. However, it is conceivable that the obstacle enters into the field of vision of the driver and is recognized, and thus the driver brakes. In such a case, if the sudden braking detection portion 30 is also installed as in the embodiment, it is possible to infer that a collision may happen from the sudden braking state of the vehicle, which makes it possible to operate the pretensioner device more effectively.

Figure 2:
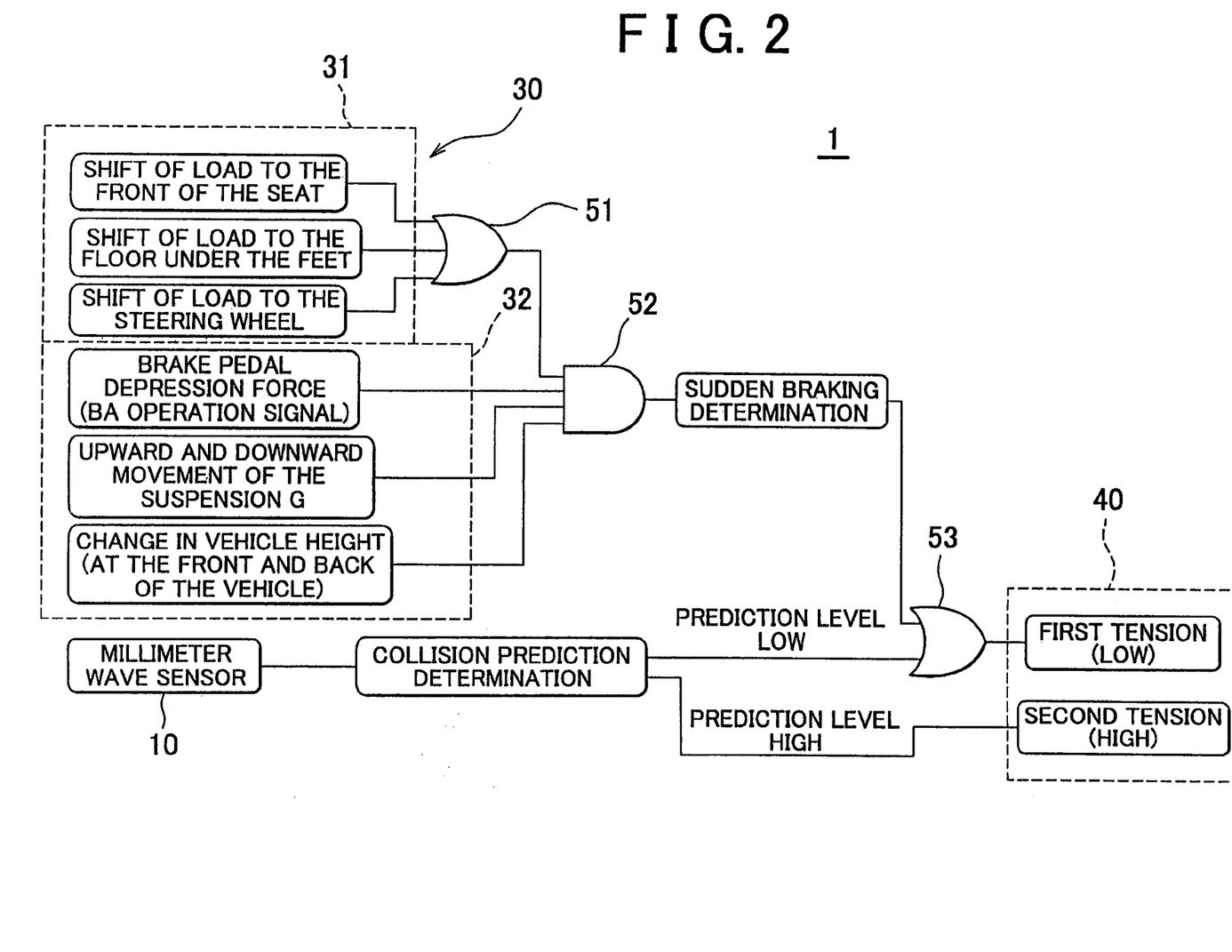
FIG. 2 shows an example of a circuit configuration which can be applied to the seat belt device according the embodiment of the invention.

FIG. 2 shows an example of a circuit configuration that can be used in the seat belt device 1. In FIG. 2, millimeter wave sensors are utilized as the obstacle detection portion 10. In addition, a number of concrete examples are given of the sensor detections of the occupant movement detection portion 31 and the vehicle condition detection portion 32 included in the sudden braking detection portion 30. Furthermore, the control portion 20 of FIG. 1 is realized using the ECU which controls the entire seat belt. In FIG. 2, all of the portions other than the millimeter wave sensor (obstacle detection portion) 10, the sudden braking detection portion 30 and the pretensioner device 40 are included in the ECU.

In FIG. 2, as the occupant movement detection portion 31, a plurality of sensors are provided for detecting the movement of the occupant inside the vehicle. These sensors detect whether the occupant of a seat has plunged forward based on the shift in load of the occupant. For example, as shown in FIG. 2, the shift in load of the occupant when moving toward the front portion of the seat is detected by a pressure sensor disposed beneath the seat of the occupant. Moreover, the shift in load of the occupant when moving toward the front of the vehicle is detected by a pressure sensor disposed beneath the feet of the occupant. In addition, the shift in load of the driver when moving toward the front of the vehicle is also detected by a pressure sensor disposed in the steering wheel. These detection signals related to the occupant are supplied to an AND circuit 52 via an OR circuit 51.

Moreover, as the vehicle condition detection portion 32, a plurality of sensors are provided for detecting whether the vehicle has suddenly tilted forward. For example, as shown in FIG. 2, the strength of a depression force is detected by a pressure sensor for detecting depression of the brake pedal. In addition, the movement of the vehicle in an upward or downward direction is detected by a G sensor for detecting upward and downward direction deceleration of the suspension, and, the state of forward tilt is detected by a sensor for detecting changes in the height of the vehicle at its front and the back. Furthermore, these sensors may detect the brake pedal depression force by referring to the operation signals from the brake assist (BA).

The aforementioned detection signals related to the vehicle are, unlike the detection signals related to the occupant, supplied directly to the AND circuit 52. In the case of the detection signals related to the occupant, if it is possible to detect that the occupant has plunged forward using any one of the sensors, it is inferred that the vehicle is in a sudden braking state.

However, in the case of the detection signals related to the vehicle, it cannot be inferred with a high degree of certainty that the vehicle is in a sudden braking state, based on the detection signal from only one sensor. This is because of situations such as when the vehicle is travelling along a slope, or along a rough road where the vehicle moves up and down substantially. As a result, it is determined that the vehicle has suddenly tilted forward only when all of the sensors related to the vehicle are in an ON state. Furthermore, among all of the detection signals, the depression force of the brake pedal most accurately reflects the fact that vehicle is in a sudden braking state. Thus, if only one detection sensor related to the vehicle is used as the vehicle condition detection portion 32, it is preferable that the sensor for detecting the depression force of the brake pedal be adopted.

Accordingly, if any one of the sensors for detecting movement of the occupant is ON or, if all of the sensors for detecting forward tilt of the vehicle are ON in the AND circuit 52, the ECU will determine that the vehicle is in a sudden braking state. In addition, as previously described, this sudden braking detection signal is supplied to the OR circuit 53, which is one of the criterion for the pretensioner device to retract the seat belt at the first tension (low).

In addition, the obstacle detection portion 10 sends a detection signal in accordance with the location of the detected obstacle. The collision detection portion of the ECU determines whether the collision prediction is a low collision prediction level or a high collision prediction level, based on the detected signal. If the prediction is a low collision prediction level, the signal is supplied to the Or circuit 53. As a result, when there is at least one of a sudden braking detection signal or a low collision prediction level, the ECU which functions as the pretensioner control portion, executes control of the pretensioner device 40 such that the seat belt is retracted at the first tension (low).

Alternatively, if the collision prediction portion predicts a high collision prediction level, the ECU executes control of the pretensioner device 40 such that the seat belt is retracted at the second tension (high). Furthermore, if sudden braking is detected when a high collision prediction level is determined, the ECU gives priority to the high collision prediction level and executes control of the pretensioner device 40 such that the seat belt is retracted at the second tension (strong).

Figure 3:
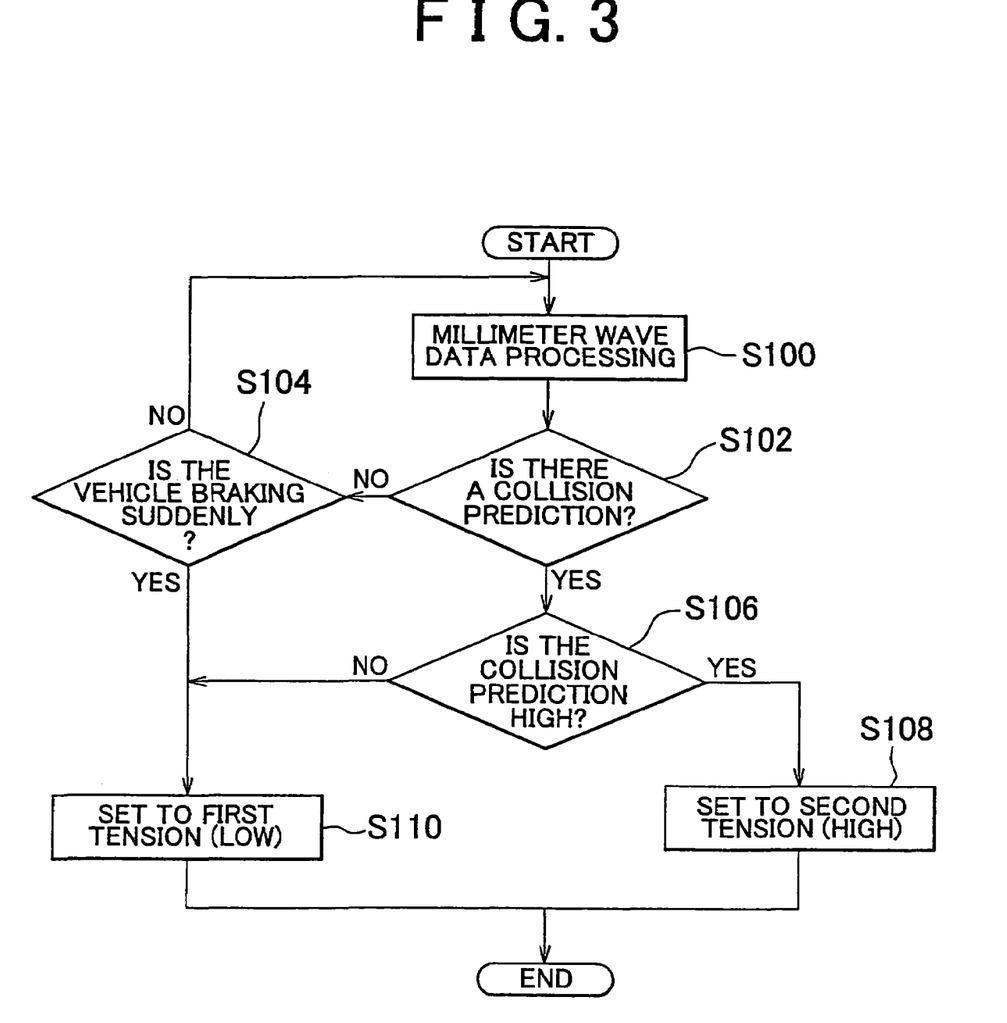
FIG. 3 is a flow chart showing an example of a routine executed by an electronic control unit.

In addition, hereinafter, an example will be described of the processing executed after collision prediction by the ECU that functions as the collision prediction portion 21 and the pretensioner control portion 22 in the seat belt device 1 according to the embodiment. FIG. 3 is a flow chart showing an example of a routine executed by the ECU.

In FIG. 3, the ECU processes the millimeter wave data periodically detected by the obstacle detection portion 10 (step S100), and monitors whether there is a possibility of a vehicle collision occurring (step S102). If a collision is not predicted in step S102, it is confirmed whether the vehicle is in a state of sudden braking (step S104). In the case that sudden braking of the vehicle is detected in step S104, the ECU sets the pretensioner device to the first tension (low) (step S110), operates the pretensioner device, and completes processing according to the routine. In the case that sudden braking of the vehicle is not detected in step S104, the ECU returns to collision monitoring based on the millimeter wave data.

If it is predicted that a collision is possible in step S102, it is determined whether the collision prediction should be a high collision prediction level or not, based on the detection signal from the millimeter wave sensor (step S106). If a high collision prediction level is determined in step S106, the ECU sets the pretensioner device to the second tension (high), operates the pretensioner device and completes processing according to the routine.

Alternatively, if the collision prediction level determined in step S106 is not high, the ECU infers that the collision prediction level is low, and thus sets the pretensioner device to first tension (low) (step S110), operates the pretensioner device and completes processing according to the routine.

In the described embodiment, as an example, collision prediction is classified into two prediction levels. However, the invention is not limited to this, and may be realized with three or more prediction levels. Furthermore, the tension set for the pretensioner device may also be divided into three levels or more in accordance with the number of prediction levels.

Furthermore, in this embodiment, when there is a collision prediction by the obstacle detection portion 10 and the collision prediction portion 21, detection of the sudden vehicle braking state by the sudden braking detection portion 30 is used as a complimentary criterion for the setting of the tension of the pretensioner device 40. However, it is possible to configure the pretensioner device 22 such that seat belt retraction is only based on the sudden braking detection of the sudden braking detection portion 30. By doing so, the seat belt device can provide occupant protection with a simpler configuration.

A preferred embodiment of the invention has been described above. However, the invention is not limited to this embodiment which is to be considered in all respects as illustrative and not restrictive. The scope of the invention is indicated by the appended claims, and all changes that come within the meaning and range of equivalency of the claims are intended to be embraced therein.

From the foregoing description, it is clearly understood that, according to the invention of the first aspect, when the collision prediction level is low, that is, the probability of a vehicle collision is comparatively low, the tension of the seat belt is set to a lower tension so that a state in which the occupant can act freely is maintained. Accordingly, following the prediction of the vehicle collision, the driver is able to smoothly execute vehicle maneuvers in order to avoid the collision. However, at the same time, preparations for the imminently expected collision can also be executed.

If there is a possibility of avoiding a collision when a collision is predicted, it is possible to use a first tension. However, if there is no possibility of avoiding the collision, it is possible to use a second tension. Accordingly, at the collision prediction stage, it is possible to change the tension of the seat belt in accordance with collision probability, so that the tension of the seat belt is optimal for the occupant of the seat.

Furthermore, it is possible to set a seat belt tension that is optimal for occupant protection, in accordance with different collision prediction levels having different collision probabilities.

Moreover, the sudden braking state of the vehicle is also taken into consideration when adjusting the tension of the seat belt, thus allowing occupant protection to be executed even more reliably.

In addition, the pretensioner device is operated by the pretensioner control portion which receives a signal from a sudden braking detection means that detects if the vehicle has suddenly tilted forward. As a result, according to the invention, occupant protection can be improved by retracting the seat belt as a precaution.

Furthermore, the invention focuses on the fact that, generally, when the driver anticipates that a collision will occur, there is a reasonable amount of time until the collision will actually take place. Thus, if collision avoidance maneuvers are continued during this time, many collisions can be avoided. As a result of the seat belt being retracted at the comparatively low first tension when the sudden braking of the vehicle is detected, such collision avoidance maneuvers can be continued.

Moreover, it is possible to reliably detect whether the vehicle is in a sudden braking state by referring to the position of the occupant and the condition of the vehicle.

The invention claimed is:

1. A seat belt device comprising:
  a first obstacle detection portion that detects an obstacle located within a predetermined distance from a vehicle in an area surrounding the vehicle;
  a second obstacle detection portion that detects the obstacle located at a longer distance from the vehicle than the predetermined distance, wherein the first obstacle detection portion and the second obstacle detection portion are different sensors having different obstacle detection ranges;
  a collision prediction portion that predicts a probability of a collision of the vehicle with the obstacle, based on a detection signal from the first obstacle detection portion or the second obstacle detection portion;

a pretensioner device that sets multiple levels of tension for a seat belt;

a sudden braking detection portion that includes an occupant movement detection portion that detects that an occupant of the vehicle has plunged forward, and a vehicle condition detection portion that detects that the vehicle has suddenly tilted forward to detect a state of sudden braking of the vehicle; and a pretensioner control portion that (1) controls, either when the obstacle is detected by the second obstacle detection portion or when the sudden braking detection portion detects a sudden braking of the vehicle, an operation of the pretensioner device such that the seat belt is retracted at a first tension prior to the collision, and (2) controls the operation of the pretensioner device such that the seat belt is retracted at a second tension prior to the collision when the obstacle is detected by the first obstacle detection portion.

2. The seat belt device according to claim 1, wherein the pretensioner device is set to one of the first tension in which the seat belt has a limited degree of slack which allows the occupant of a seat to move, and the second tension which is higher than the first tension and where a body of the occupant of the seat is restrained.

3. The seat belt device according to claim 2, wherein the collision prediction portion determines that a collision prediction level is a low collision prediction level indicating that there is a possibility that the vehicle may avoid the collision when the second obstacle detection portion detects the obstacle, and determines that the collision prediction level is a high collision prediction level indicating that the vehicle collision is unavoidable when the first obstacle detection portion detects the obstacle; and the pretensioner control portion that controls the pretensioner device such that, if the collision prediction portion determines that the collision prediction level is the low collision prediction level then the seat belt is retracted at the first tension, and if the collision prediction portion determines that the collision prediction level is the high collision prediction level then the seat belt is retracted at the second tension.

4. The seat belt device according to claim 2, wherein a larger amount of electric power is supplied to a motor for seat belt retraction when the seat belt is retracted at the second tension than when the seat belt is retracted at the first tension.

5. The seat belt device according to claim 1, wherein the occupant movement detection portion is a sensor that detects a state of forward plunge of the occupant, based on a shift in load of the occupant with respect to a specific location in the vehicle.

6. The seat belt device according to claim 1, wherein the vehicle condition detection portion is a sensor that detects that the vehicle has suddenly tilted forward, based on at least a depression force of a brake pedal.

7. A seat belt control method comprising the steps of:

detecting an obstacle located within a predetermined distance from a vehicle in an area surrounding the vehicle by a first obstacle detection portion;

detecting the obstacle at a longer distance from the vehicle than the predetermined distance by a second obstacle detection portion, wherein the first obstacle detection portion and the second obstacle detection portion are different sensors having different obstacle detection ranges;

predicting a probability of the vehicle colliding with the obstacle;

determining a level of the predicted collision;

detecting a sudden braking of the vehicle by detecting that an occupant of the vehicle has plunged forward, or that the vehicle has suddenly tilted forward to detect a state of sudden braking of the vehicle;

controlling an operation of a pretensioner device such that a seat belt is retracted at a first tension prior to the collision, either when the obstacle is detected by the second obstacle detection portion or when the sudden braking detection portion detects the sudden braking of the vehicle; and controlling the operation of the pretensioner device such that the seat belt is retracted at a second tension prior to the collision when the obstacle is detected by the first obstacle detection portion.

8. The seat belt control method according to claim 7, wherein the tension at which the seat belt is retracted is set to be one of the first tension in which the seat belt has a limited degree of slack which allows the occupant of a seat to move, and the second tension which is higher than the first tension and where a body of the occupant of a seat is restrained.

9. The seat belt control method according to claim 8, wherein in the step of determining the level of the predicted collision, a collision prediction level is determined as a low collision prediction level indicating that there is a possibility that the vehicle may avoid the collision when the obstacle is detected by the second obstacle detection portion, and a collision prediction level is determined as a high collision prediction level indicating that the vehicle collision is unavoidable when the obstacle is detected by the first obstacle detection portion; and the seat belt is retracted at the first tension when the collision prediction level is determined as the low collision prediction level, and is retracted at the second tension when the collision prediction level is determined as the high collision prediction level.

10. The seat belt control method according to claim 8, wherein a larger amount of electric power is supplied to a motor for seat belt retraction when the seat belt is retracted at the second tension than when the seat belt is retracted at the first tension.

11. A seat belt device comprising:

an obstacle detection portion that detects an obstacle in an area surrounding a vehicle;

a collision prediction portion that predicts a probability of a collision of the vehicle with the obstacle, based on a detection signal from the obstacle detection portion;

a pretensioner device that retracts a seat belt;

a sudden braking detection portion which includes an occupant movement detection portion that detects that an occupant of the vehicle has plunged forward and a vehicle condition detection portion that detects that the vehicle has suddenly tilted forward, and which determines the vehicle sudden braking when the occupant movement detection portion detects that the occupant of the vehicle has plunged forward and the vehicle condition detection portion detects that the vehicle has suddenly tilted forward; and a pretensioner control portion that controls, when the sudden braking detection portion determines the vehicle sudden braking, the operation of the pretensioner device such that the seat belt is retracted prior to the collision.

12. The seat belt device according to claim 11, wherein the occupant movement detection portion includes a plurality of occupant movement sensors that detect a state of forward plunge of the occupant, based on a shift in load of the occupant with respect to a specific location in the vehicle, each of the occupant movement sensors being provided at each of at least two of the specific locations, and detecting the state of forward plunge of the occupant independently each other, the vehicle condition detection portion includes a first sensor that detects that the vehicle has suddenly tilted forward, based on a depression force of the brake pedal, a second sensor that detects that the vehicle has suddenly tilted forward, based on upward and downward direction deceleration of a suspension of the vehicle, and a third sensor that detects that the vehicle has suddenly tilted forward, based on changes in a height of the vehicle at the vehicle's front and back, the sudden braking detection portion detects the state of sudden braking of the vehicle when at least one of a plurality of the occupant movement sensors detects the state of forward plunge of the occupant and each of the first, the second and the third sensors detects that the vehicle has suddenly tilted forward.

* * * * *